(12) United States Patent
Yoshimoto et al.

(10) Patent No.: US 10,518,809 B2
(45) Date of Patent: Dec. 31, 2019

(54) VEHICLE REAR STRUCTURE

(71) Applicant: TOYOTA JIDOSHA KABUSHIKI KAISHA, Toyota-shi (JP)

(72) Inventors: Masanori Yoshimoto, Okazaki (JP); Kazuhiro Kitagawa, Toyota (JP)

(73) Assignee: TOYOTA JIDOSHA KABUSHIKI KAISHA, Toyota-shi (JP)

( * ) Notice: Subject to any disclaimer, the term of this patent is extended or adjusted under 35 U.S.C. 154(b) by 85 days.

(21) Appl. No.: 15/911,792

(22) Filed: Mar. 5, 2018

(65) Prior Publication Data
US 2018/0251157 A1    Sep. 6, 2018

(30) Foreign Application Priority Data
Mar. 3, 2017    (JP) .................... 2017-040632

(51) Int. Cl.
| | | |
|---|---|---|
| *B60J 7/00* | (2006.01) | |
| *B62D 21/03* | (2006.01) | |
| *B62D 27/02* | (2006.01) | |
| *B62D 21/15* | (2006.01) | |
| *B62D 29/00* | (2006.01) | |

(52) U.S. Cl.
CPC ........... *B62D 21/03* (2013.01); *B62D 27/023* (2013.01); *B62D 21/152* (2013.01); *B62D 29/007* (2013.01)

(58) Field of Classification Search
CPC ........... B62D 55/08; E02F 3/64; B60G 11/22; B60K 17/10; B60K 23/0808; B60N 2/36; B60T 8/1755; B60T 8/1769; B60R 9/06; B60R 9/10
See application file for complete search history.

(56) References Cited

U.S. PATENT DOCUMENTS

| | | | | |
|---|---|---|---|---|
| 8,480,165 B2 * | 7/2013 | Koyama | ............ | B62D 25/2027 296/203.04 |
| 10,005,349 B2 * | 6/2018 | Baccouche | .......... | B62D 25/087 |
| 10,112,470 B2 * | 10/2018 | Hamilton | ................. | B60K 1/04 |
| 10,421,500 B2 * | 9/2019 | Tanabe | .................... | B62D 21/02 |
| 2006/0121795 A1* | 6/2006 | Hashimura | .......... | B60K 15/063 439/681 |
| 2014/0008137 A1* | 1/2014 | Shiromura | ............... | B60K 1/04 180/68.5 |
| 2014/0159422 A1 | 6/2014 | Iwamoto et al. | | |
| 2017/0106912 A1* | 4/2017 | Matsuura | ............. | B62D 27/065 |

(Continued)

FOREIGN PATENT DOCUMENTS

| | | |
|---|---|---|
| JP | 2002-19643 A | 1/2002 |
| WO | WO 2013/031008 A1 | 3/2013 |

*Primary Examiner* — Kiran B Patel
(74) *Attorney, Agent, or Firm* — Oblon, McClelland, Maier & Neustadt, L.L.P.

(57) ABSTRACT

Rear side members include: side walls inclined outward in the vehicle width direction; and side wall flanges bent from front ends of the side walls, and extending inward in the vehicle width direction. A center floor cross member has a side wall contacting with the side wall flanges of the rear side members. Reinforcement members include: side walls extending to the side wall of the center floor cross member; and flanges bent from rear ends of the side walls, extending outward in the vehicle width direction, and at least partially coinciding with the side wall flanges of the rear side members in the vehicle width direction with the side wall of the center floor cross member interposed therebetween.

5 Claims, 12 Drawing Sheets

(56) References Cited

U.S. PATENT DOCUMENTS

| | | | |
|---|---|---|---|
| 2019/0061507 A1* | 2/2019 | Nitta | H01M 2/1083 |
| 2019/0061830 A1* | 2/2019 | Fujisawa | B62D 25/08 |
| 2019/0152531 A1* | 5/2019 | Otoguro | B62D 25/04 |
| 2019/0276093 A1* | 9/2019 | Tatsuwaki | B60K 1/04 |

* cited by examiner

< SECTION A-A >

< SECTION B-B >

< SECTION C-C >

VEHICLE REAR STRUCTURE

INCORPORATION BY REFERENCE

The disclosure of Japanese Patent Application No. 2017-040632 filed on Mar. 3, 2017 including the specification, drawings and abstract is incorporated herein by reference in its entirety.

BACKGROUND

1. Technical Field

The present disclosure relates to a vehicle rear structure, and particularly, to a frame-member structure of a vehicle rear.

2. Description of Related Art

Figure 10:
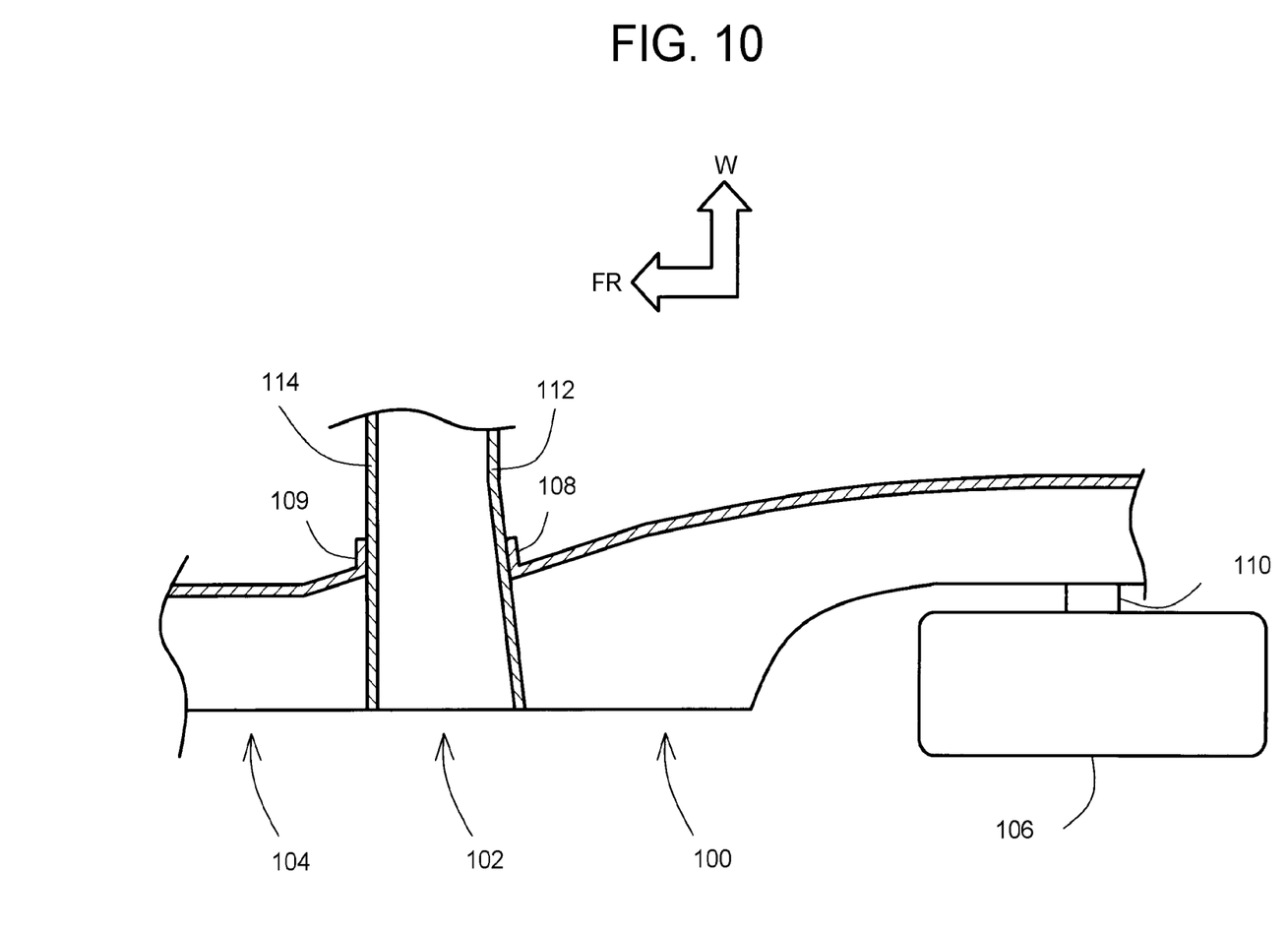
FIG. 10 is a view explaining a vehicle rear structure of related art.

FIG. 10 exemplifies a plan view of parts of frame members maintaining strength of a vehicle, the frame members included in an underbody of the vehicle. Specifically, the frame members shown in FIG. 10 are provided from a center part in the traveling direction of the vehicle to the vehicle rear and its vicinity, and the frame members include rear side members 100, a center floor cross member 102, and under reinforcements 104. In FIG. 10, an illustration of a rocker (also referred to as a side sill) provided at an end part in the vehicle width direction adjacent to each under reinforcement 104 is omitted for convenience.

The rear side member 100 is provided so as to extend in the vehicle longitudinal direction (a direction FR in the drawing), and a flange 108 that is a front end of the rear side member 100 is in contact with a side wall 112 of the center floor cross member 102. The center floor cross member 102 is provided so as to extend in the vehicle width direction (a direction W in the drawing). Each under reinforcement 104 is provided so as to extend in the vehicle longitudinal direction (the direction FR in the drawing), and a flange 109 that is a rear end of the under reinforcement 104 is in contact with a side wall 114 (an opposite side wall) of the center floor cross member 102.

As disclosed in FIG. 10 and International Publication No. WO2013/031008, each rear side member 100 is provided so as to extend from the vehicle rear to the vehicle front in a manner as to be inclined (in an arc shape) outward in the vehicle width direction from the inner side in the vehicle width direction so as to avoid each vehicle rear wheel 106.

SUMMARY

Figure 11:
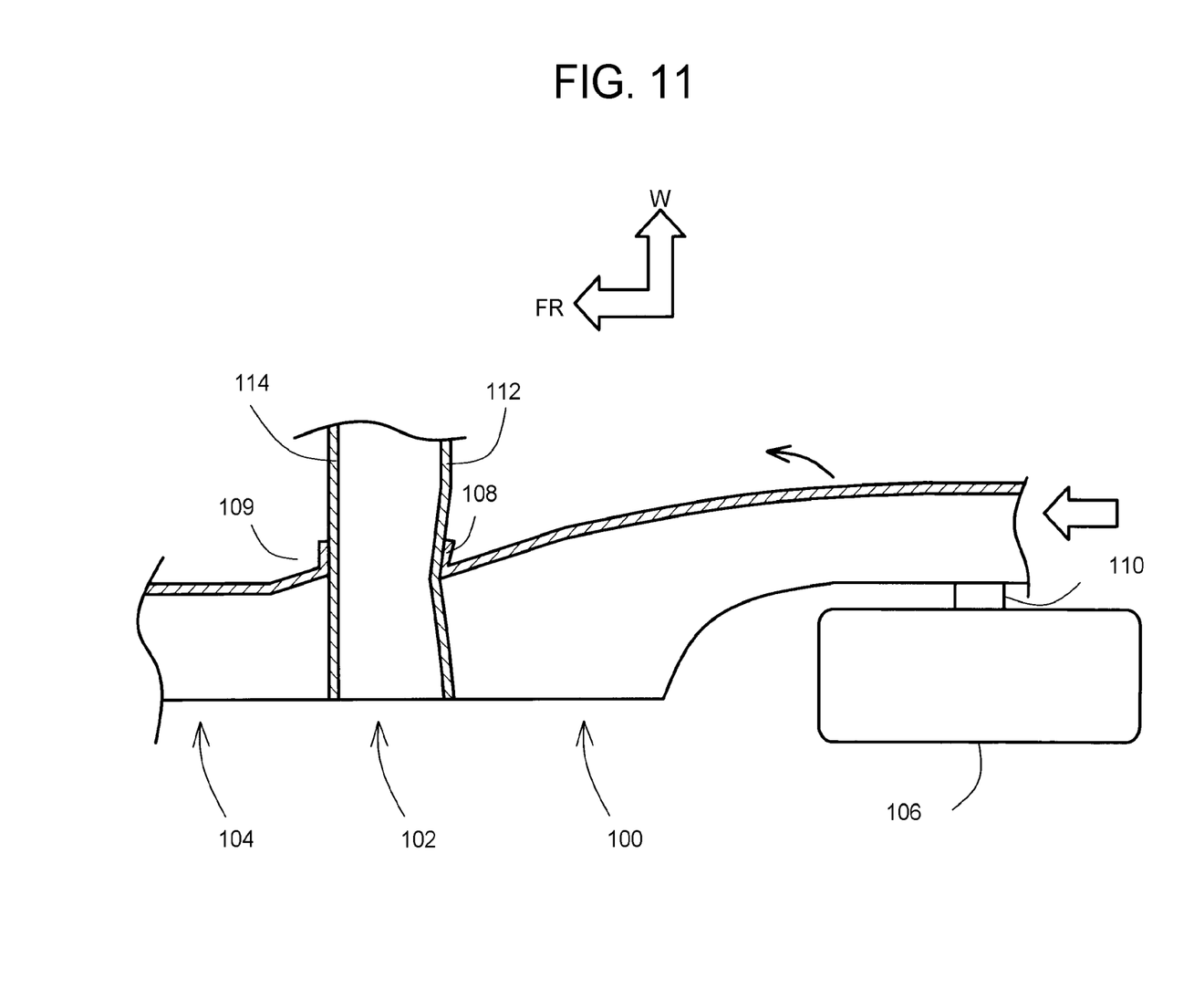
FIG. 11 is a view schematically showing a condition in a first half period of a rear collision relative to the vehicle rear structure of the related art.

By the way, when an obstacle (a barrier) collides against the vehicle from behind the vehicle or the vehicle collides the obstacle (the barrier) against the obstacle (the barrier) from behind the vehicle, so-called rear collision happens, due to a shape of the rear side members 100 and its peripheral structure, a so-called inward tilting may be caused. FIG. 11 shows an example of a condition in a first half period of a rear collision. Due to the rear collision, a load is inputted into the rear side member 100 from the vehicle rear. At this time, because the rear side members 100 have a shape gradually opening outward from the inner side in the vehicle width direction across between the vehicle rear and the vehicle front, the rear side member 100 tilts toward the vehicle inner side (a direction W in the drawing) around the flange 108 located at the front end of the rear side member 100, that is, so-called inward tilting is likely to be caused.

Figure 12:
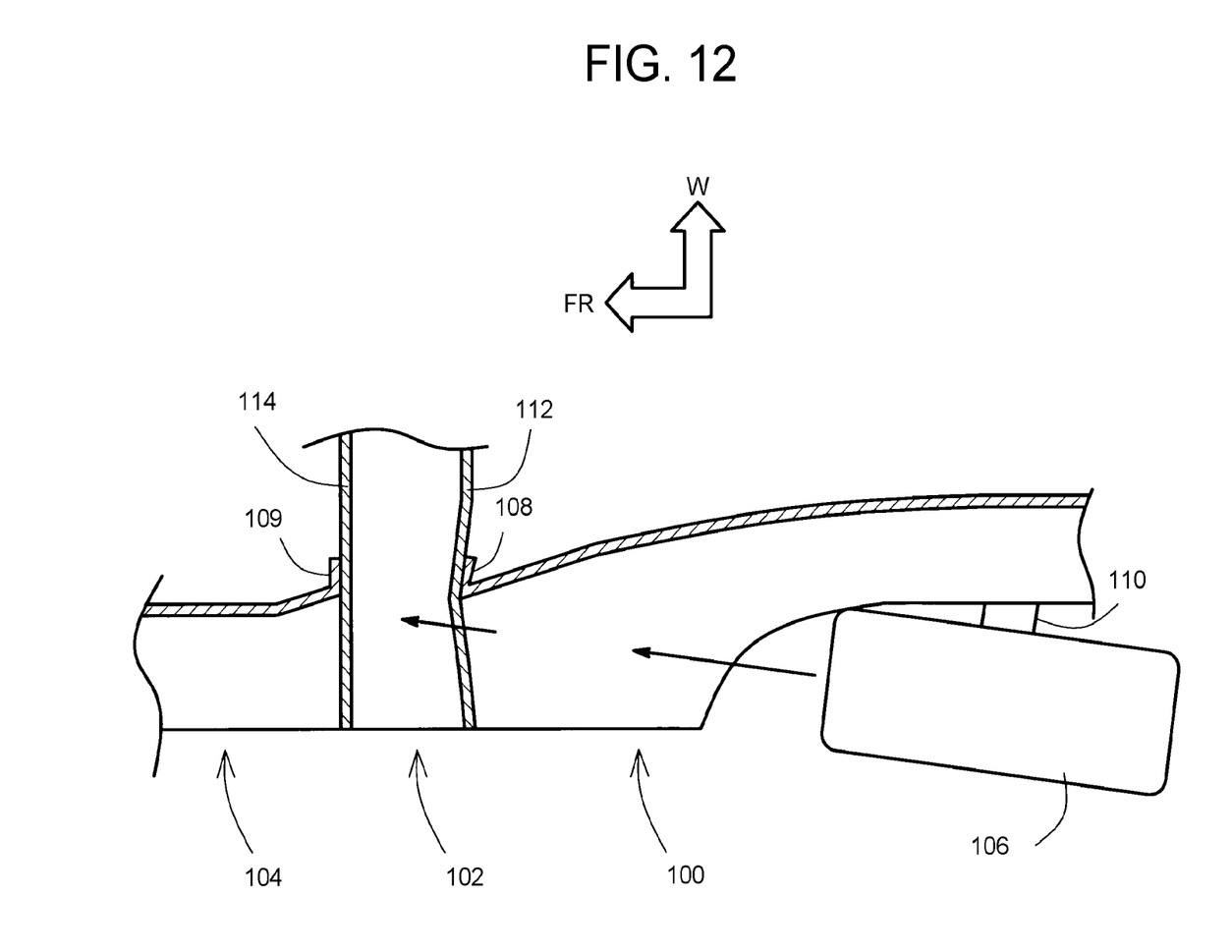
FIG. 12 is a view schematically showing a condition in a last half period of the rear collision relative to the vehicle rear structure of the related art.

Further, as shown in FIG. 12, in a last half period of the rear collision, the obstacle collides from behind the rear wheel 106, and due to this, the rear wheel 106 may push the rear side member 100 into the vehicle inner side around the suspension 110 as a rotation center.

To cope with this, in light of securing a cabin space at a rear collision time, an object of the present disclosure is to provide a vehicle rear structure capable of suppressing a rear side member from tilting inward more than the related art.

The present disclosure relates to a vehicle rear structure. This vehicle rear structure includes rear side members, a cross member, and reinforcement members. The rear side members include first side walls provided so as to extend from a vehicle rear to a vehicle front in a manner as to be inclined outward from an inner side in the vehicle width direction so as to avoid vehicle rear wheels, and first flanges that are bent from front ends of the first side walls, and extend inward in the vehicle width direction. The cross member has a second side wall provided so as to extend in the vehicle width direction in a manner as to be in contact with the first flanges of the rear side members. The reinforcement members include: third side walls provided so as to extend to the second side wall of the cross member from the vehicle front toward the vehicle rear; and second flanges provided in a manner as to be bent from rear ends of the third side walls, extend outward in the vehicle width direction, and at least partially coincide with the first flanges of the rear side members in the vehicle width direction with the second side wall of the cross member interposed therebetween.

Each of the rear side members is configured in an inward-hook shaped structure in which the first flange is bent inward in the vehicle width direction from the first side wall, and each of the reinforcement members is configured in an outward-hook shaped structure in which the second flange is bent outward in the vehicle width direction from the third side wall. In addition, the both flanges are arranged to oppose each other with the second side wall of the cross member interposed therebetween. With this configuration, when a load is inputted from behind the vehicle into the rear side member, there is caused force that turns the rear side member in the outward direction around a bending point between the third side wall and the second flange of the reinforcement member as a rotation center. Accordingly, it is possible to suppress the rear side member from tilting inward more than the related art.

In the above disclosure, the cross member may include a fourth side wall that opposes the second side wall of the cross member. In this case, each reinforcement member may include a third flange that is bent from a front end of the third side wall of the reinforcement member, extends in the vehicle width direction, and is in contact with a fourth side wall of the cross member. In addition, the vehicle rear structure may further include frame members each of which includes: a fourth flange that is in contact with the fourth side wall of the cross member in a manner as to at least partially coincide with the third flange of the reinforcement member in the vehicle width direction with the fourth side wall of the cross member interposed therebetween; and a fifth side wall that is bent from the fourth flange and extends to the vehicle front.

By setting the third flange of each reinforcement member and the fourth flange of each frame member to overlap with each other in the vehicle width direction, the load having been transmitted to the rear side member and the reinforcement member is also transmitted to the frame member. The load is efficiently transmitted from the vehicle rear to the vehicle front, to thereby suppress deformation of the vehicle rear.

In the above disclosure, the third side walls of the reinforcement members and the fifth side walls of the frame members may coincide with each other at respective positions in the vehicle width direction.

By setting the side wall of each reinforcement member and the side wall of each frame member to coincide with each other in the vehicle width direction, it is possible to efficiently transmit the load (a compressive load) having been transmitted to the third side wall of the reinforcement member to the side wall of the frame member.

In the above disclosure, the frame members may be under reinforcements provided under a vehicle cabin.

By transmitting the load at the rear collision time to the under reinforcement, it is possible to transmit the load to the front side member connected to the front end of the under reinforcement, to thereby transmit (distribute) the load at the rear collision time across between the vehicle rear and the vehicle front.

In the above disclosure, the frame members may be rockers provided at end parts in the vehicle width direction.

By transmitting the load at the rear collision time to the rocker, it is possible to transmit the load to a torque box and the front side member connected to a front end of the rocker, to thereby transmit (distribute) the load at the rear collision time across between the vehicle rear and the vehicle front.

According to the present disclosure, it is possible to suppress the rear side member from tilting inward at the rear collision time more than the related art.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein.

DETAILED DESCRIPTION OF EMBODIMENTS

Figure 1:
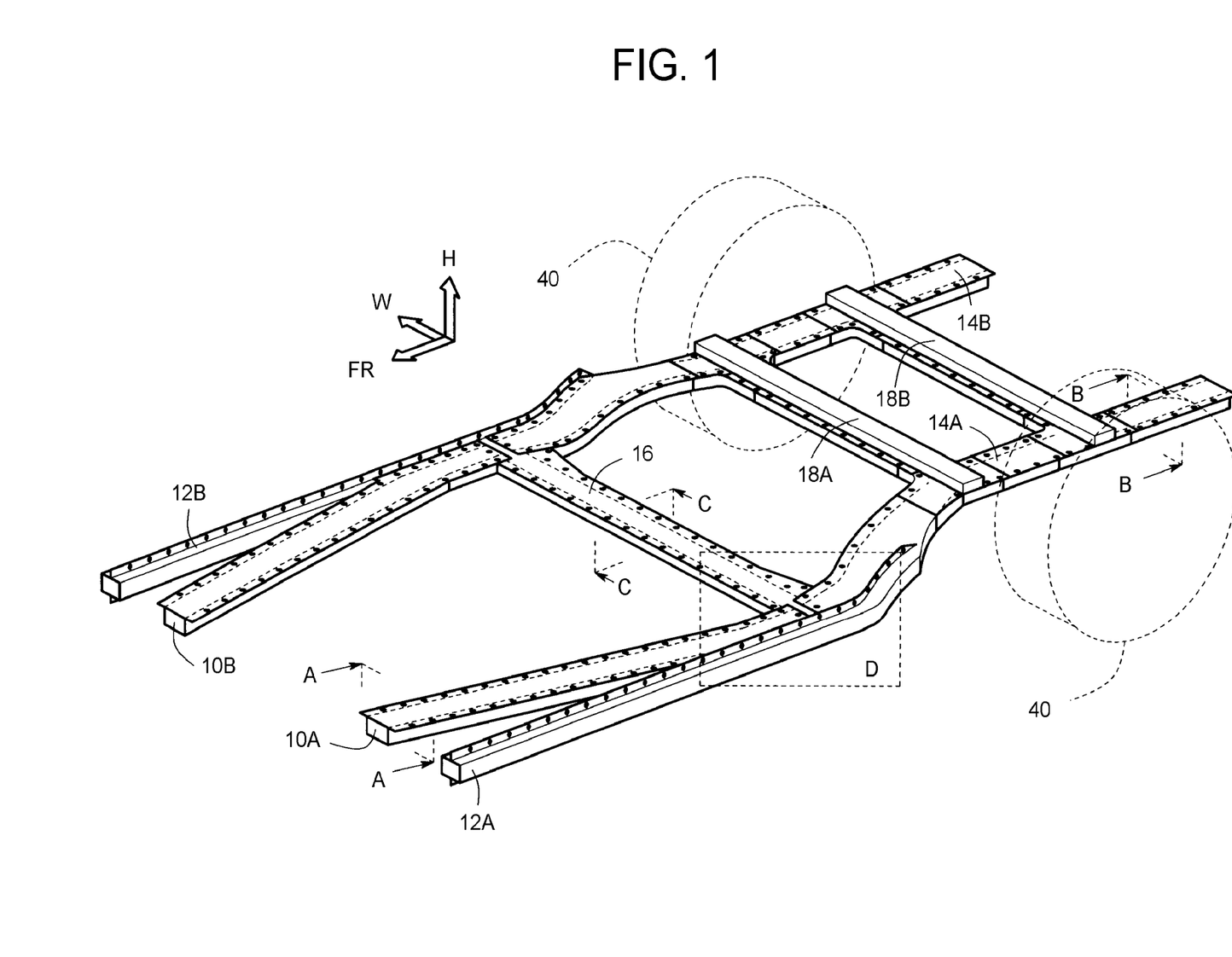
FIG. 1 is a perspective view exemplifying a part of a frame structure in an under body of a vehicle according to the present embodiment.

FIG. 1 shows an example of a part of a frame structure in an underbody of a vehicle according to the present embodiment. In FIG. 1 to FIG. 12, a vehicle frontward direction is shown by an axis indicated by a reference sign FR, a vehicle width direction is shown by an axis indicated by a reference sign W, and a vehicle height direction is shown by an axis indicated by a reference sign H. As shown in FIG. 1, these FR, W, H axes are orthogonal to one another. Hereinafter, when the frame structure according to the present embodiment is described, the description will be appropriately provided using these three axes.

For example, a "front end" represents an end in the positive direction of the FR axis, a "rear end" represents an end in the negative direction of the FR axis. A "vehicle inner side" represents a vehicle inner side along the W axis, and a "vehicle outer side" represents a vehicle outer side along the W axis. In addition, a "vehicle upward direction" represents a positive direction of the H axis, and a "vehicle downward direction" represents a negative direction of the H axis.

The frame structure of the vehicle can roughly be divided into frame members (longitudinal frames) extending in the vehicle longitudinal direction and frame members (lateral frames) extending in the vehicle width direction. The former (the longitudinal frames) mainly transfers a collision energy in the vehicle longitudinal direction, and the latter (the lateral frames) mainly transfers a collision energy in the vehicle lateral direction.

As the longitudinal frames, FIG. 1 shows under reinforcements 10A, 10B, rockers 12A, 12B (also referred to as side sills), and rear side members 14A, 14B, from the vehicle front. As the lateral frames, FIG. 1 shows a center floor cross member 16, and rear cross members 18A, 18B.

The under reinforcements 10A, 10B are provided so as to extend in the vehicle frontward direction from both ends in the vehicle width direction of the center floor cross member 16. The front ends of the under reinforcements 10A, 10B are connected to a front side member (not illustrated), and the rear ends thereof are connected to the center floor cross member 16. In addition, the under reinforcements 10A, 10B are provided in a manner as to inwardly extend in the vehicle width direction as they extend toward the vehicle front, and also have a function to reinforce a floor surface of a vehicle cabin.

Figure 2:
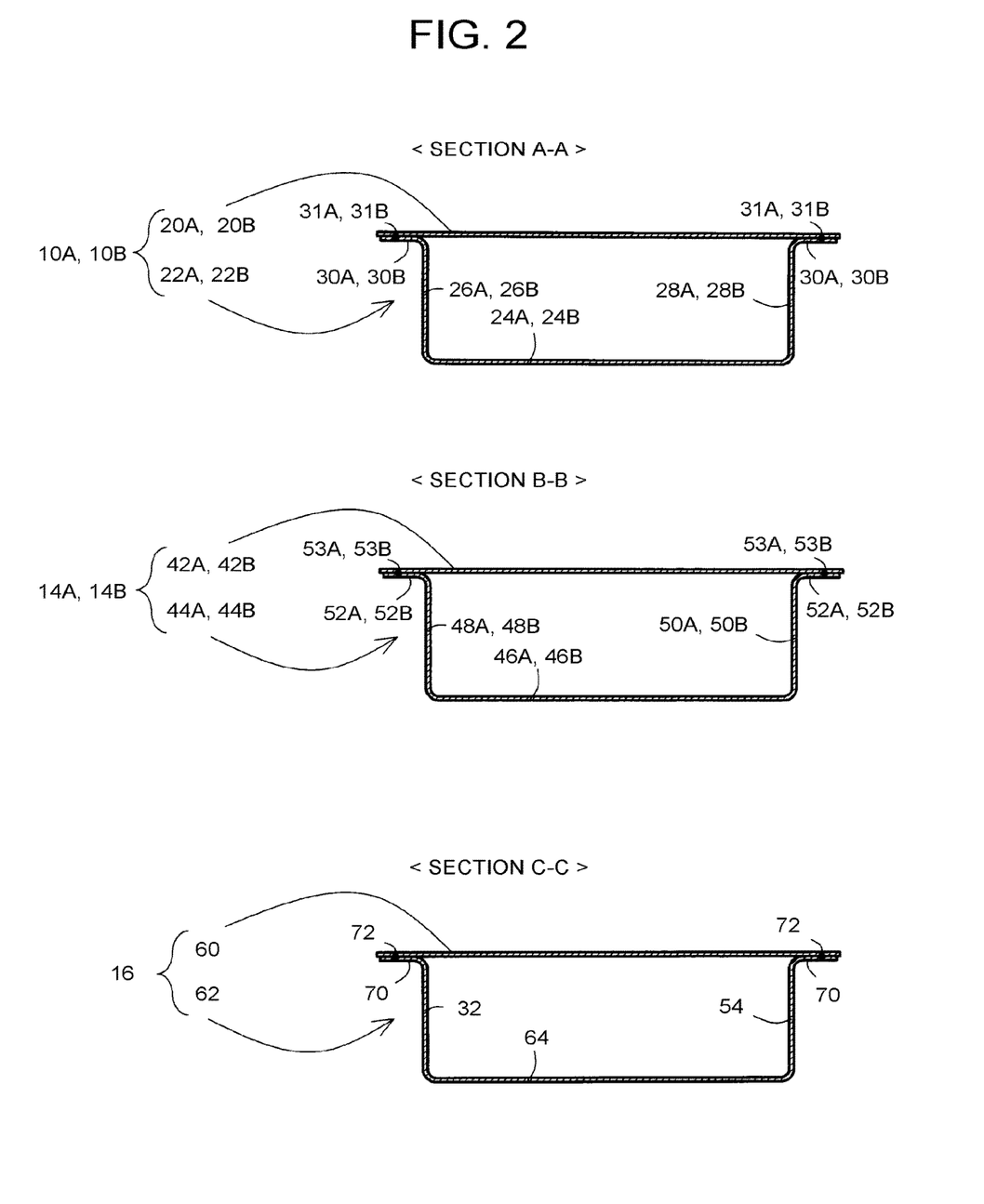
FIG. 2 is a view exampling a sectional view of an under reinforcement, a rear side member, and a center floor cross member.

FIG. 2 shows a section A-A in FIG. 1. The under reinforcements 10A, 10B include under reinforcement upper parts 20A, 20B and under reinforcement lower parts 22A, 22B, respectively. These members are all composed by rigid materials such as high-tensile steel materials, and for example, these members are formed by cold-pressing, hot-pressing (hot-stamping), or the like.

Each of the under reinforcement lower parts 22A, 22B has a hat (hat with a brim)-like sectional shape, and the under reinforcement lower parts 22A, 22B respectively include bottom walls 24A, 24B, side walls 26A, 26B, opposite side walls 28A, 28B, and upper flanges 30A, 30B. Both the side walls 26A, 26B and the opposite side walls 28A, 28B erect from the bottom walls 24A, 24B in a substantially vertical direction (in a height direction H), and the upper flanges 30A, 30B are provided in a substantially horizontal direction (in a width direction W) from the side walls 26A, 26B and the opposite side walls 28A, 28B.

Each of the under reinforcement upper parts 20A, 20B has a flat plate-like shape, and the under reinforcement upper parts 20A, 20B are disposed across upper flanges 30A, 30A or 30B, 30B so as to close openings of the under reinforcement lower parts 22A, 22B. Spot-welding or the like is applied to any positions 31A, 31B of contact surfaces of the under reinforcement upper parts 20A, 20B with the upper flanges 30A, 30B so as to form closed sections.

Figure 3:
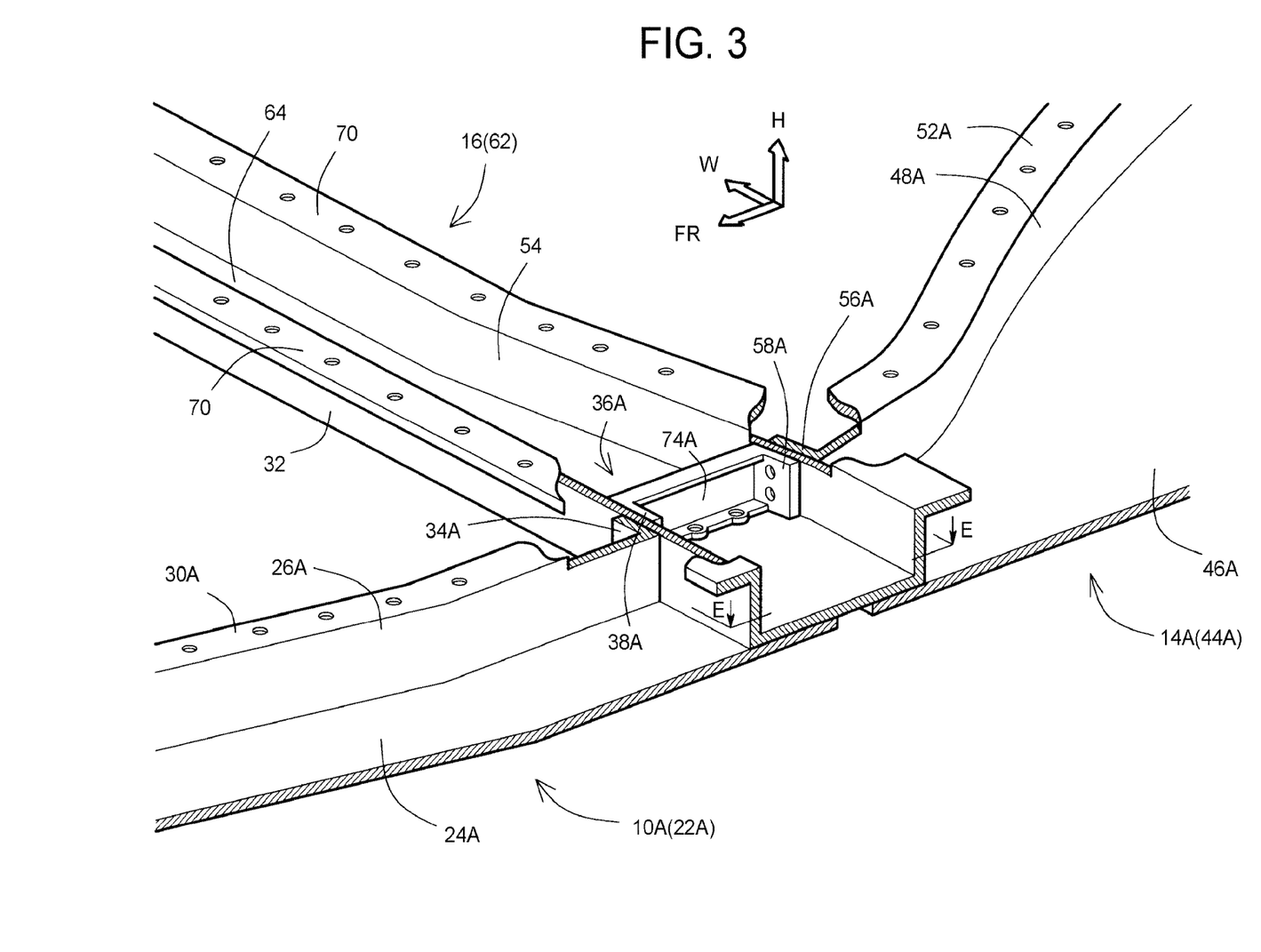
FIG. 3 is an enlarged perspective view of connecting positions of the under reinforcement, the rear side member, and the center floor cross member.

FIG. 3 shows an enlarged perspective view of a broken-line part indicated by D in FIG. 1. In this drawing, illustrations of the opposite side wall 28A of the under reinforcement 10A and the rocker 12A in contact with this are omitted for convenience. In addition, with respect to other members in addition to the under reinforcement 10A, illustrations of the respective upper parts 20A, 42A, 60 are also omitted, and only the respective lower parts 22A, 44A, 62 are illustrated. Furthermore, partial illustrations of the upper flange 30A, 52A, 70 are omitted.

The following description regarding FIG. 3 is pertinent to the under reinforcement 10A and the rear side member 14A; but the rear end of the under reinforcement 10B and the front end and its vicinity of the rear side member 14B also have the same structures as the following structures. For example, descriptions of the under reinforcement 10 and the rear side member 14 whose end reference numerals A (such as 10A) are replaced with B (such as 10B) correspond to description of the structures and peripheral structures of the under reinforcement 10B and the rear side member 14B.

A side wall 26A (a fifth side wall) of the under reinforcement 10A is provided so as to extend in the vehicle longitudinal direction, and its rear end is provided so as to extend to an opposite side wall 32 (a fourth side wall) of the center floor cross member 16. Further, there is provided a side wall flange 34A (a fourth flange) that is bent from the rear end of the side wall 26A, and extends in the vehicle width direction so as to be in contact with an opposite side wall 32 (a fourth side wall) of the center floor cross member 16. For example, as shown in FIG. 3, the side wall flange 34A is bent inward in the vehicle width direction from the side wall 26A, and the side wall 26A and the side wall flange 34A form an inward-hook shape facing in the vehicle inner side.

The side wall flange 34A (the fourth flange) is provided in a manner as to partially coincide (overlap) with an opposite flange 38A (a third flange) of a reinforcement member 36A in the vehicle width direction with the opposite side wall 32 (a fourth side wall) of the center floor cross member 16 interposed therebetween. As described later, with this structure, the under reinforcement 10A can transmit a load from the reinforcement member 36A.

With reference to FIG. 1 again, the rear side members 14A, 14B are provided so as to extend from the vehicle rear to the vehicle front in a manner as to be inclined (in an arc shape) outward from the inner side in the vehicle width direction so as to avoid rear wheels 40 of the vehicle. Front ends of the rear side members 14A, 14B are connected to the center floor cross member 16, and rear ends thereof are connected to a rear bumper reinforcement member (not illustrated). The rear cross members 18A, 18B are connected to the rear side members 14A, 14B at respective intermediate positions of the rear side members 14A, 14B in a manner as to extend across the both rear side members.

FIG. 2 shows a section B-B in FIG. 1. The rear side members 14A, 14B include rear side member upper parts 42A, 42B and rear side member lower parts 44A, 44B, in the same manner as the under reinforcements 10A, 10B. These members are all composed by rigid materials such as high-tensile steel materials, and for example, these members are formed by cold-pressing, hot-pressing (hot-stamping), or the like.

Each of the rear side member lower parts 44A, 44B has a hat (hat with a brim)-like sectional shape, and the rear side member lower parts 44A, 44B include bottom walls 46A, 46B, side walls 48A, 48B, opposite side walls 50A, 50B, and upper flanges 52A, 52B. Both the side walls 48A, 48B and the opposite side walls 50A, 50B erect from the bottom walls 46A, 46B in a substantially vertical direction (in the height direction H), and the upper flanges 52A, 52B are provided in a substantially horizontal direction (in the width direction W) from the side walls 48A, 48B and the opposite side walls 50A, 50B.

Each of the rear side member upper parts 42A, 42B has a flat plate-like shape, and the rear side member upper parts 42A, 42B are disposed across upper flanges 52A, 52A or 52B, 52B so as to close openings of the rear side member lower parts 44A, 44B. Spot-welding or the like is applied to any positions 53A, 53B of contact surfaces of the rear side member upper parts 42A, 42B with the upper flanges 52A, 52B so as to form closed sections.

With reference to FIG. 3, the side wall 48A (a first side wall) of the rear side member 14A is provided so as to extend from the vehicle rear to the vehicle front in a manner as to be inclined outward in the vehicle width direction so as to avoid the vehicle rear wheel 40, and the front end of the side wall 48A is in contact with a side wall 54 (a second side wall) of the center floor cross member 16. Further, there is provided a side wall flange 56A (a first flange) that is bent from the front end of the side wall 48A (the first side wall), and extends inward in the vehicle width direction along the side wall 54 (the second side wall) of the center floor cross member 16. With this bending structure, the side wall 48A and the side wall flange 56A form an inward-hook shape facing in the vehicle inner side.

The side wall flange 56A (the first flange) is provided in a manner as to partially coincide (overlap) with a flange 58A (a second flange) of the reinforcement member 36A in the vehicle width direction with the side wall 54 (the second side wall) of the center floor cross member 16 interposed therebetween. As described later, with this structure, it is possible to transmit a load to the reinforcement member 36A from the rear side member 14A at the rear collision time.

With reference to FIG. 1 again, the center floor cross member 16 is a frame member that is disposed at a center position in the vehicle longitudinal direction, and extends in the vehicle width direction. Both ends (both ends in the vehicle width direction) of the center floor cross member 16 are surrounded by the rear ends of the under reinforcements 10A, 10B, the front ends of the rear side members 14A, 14B, and the side walls of the rockers 12A, 12B.

FIG. 2 shows a section C-C in FIG. 1. The center floor cross member 16 includes a cross member upper part 60 and a cross member lower part 62, in the same manner as the under reinforcements 10A, 10B and the rear side members 14A, 14B. These members and parts are all composed by rigid materials such as high-tensile steel materials, and for example, these members are formed by cold-pressing, hot-pressing (hot-stamping), or the like.

The cross member lower part 62 has a hat (hat with a brim)-like sectional shape, and the cross member lower part 62 includes a bottom wall 64, the side wall 54, the opposite side wall 32 opposite to the side wall 54, and upper flange 70. The side wall 54 and the opposite side wall 32 both erect from the bottom wall 64 in the substantially vertical direction (in the direction of the height H), and the upper flange 70 is provided in the substantially horizontal direction (in the direction of the width W) from the side wall 54 and the opposite side wall 32.

The cross member upper part 60 has a flat plate-like shape, and the cross member upper part 60 is disposed across the upper flanges 70,70 opposing each other so as to close an opening of the cross member lower part 62. Spot-welding or the like is applied to any positions 72 of contact surface of the cross member upper part 60 with the upper flange 70 so as to form a closed section.

With reference to FIG. 3, the side wall 54 (the second side wall), the bottom wall 64, and the opposite side wall 32 (the fourth side wall) of each center floor cross member 16 are provided so as to extend in the vehicle width direction. The side wall 54 (the second side wall) is held between and in contact with both a side wall flange 56 of the rear side member 14A and the flange 58A (the second flange) of the reinforcement member 36A. Similarly, the opposite side wall 32 (the fourth side wall) of the center floor cross member 16 is held between and in contact with both the opposite flange 38A (the third flange) of the reinforcement member 36A and the side wall flange 34A (the fourth flange) of the under reinforcement 10A.

The reinforcement members 36A, 36B are disposed to the cross member lower part 62. The reinforcement members 36A, 36B are composed by rigid materials such as high-tensile steel materials, and, for example, these members are formed by cold-pressing, hot-pressing (hot-stamping), or the like. The reinforcement members 36A, 36B are also referred to as "bulks".

The reinforcement members 36A, 36B are members that connect the side walls 48A, 48B of the rear side members 14A, 14B and the side walls 26A, 26B of the under reinforcements 10A, 10B, and have a function to reinforce the "longitudinal frames" provided so as to extend in the vehicle longitudinal direction.

As shown in FIG. 3, the reinforcement member 36A includes the flange 58A (the second flange), the opposite flange 38A (the third flange), and a side wall 74A (the third side wall) that connects the both flanges. The side wall 74A (the third side wall) is provided so as to extend from the vehicle front toward the vehicle rear, and a front end thereof is in contact with the opposite side wall 32 (the fourth side wall) of the center floor cross member 16, and a rear end thereof is in contact with the side wall 54 (the second side wall) of the center floor cross member 16.

Because of symmetry of the members, illustrations thereof are omitted, but the reinforcement member 36B has the same configuration as that of the reinforcement member 36A. Specifically, in the following description, the configuration of the reinforcement member 36A whose reference numeral A (such as the opposite flange 38A) is replaced with B (such as the opposite flange 38B) corresponds to the configurations of the reinforcement member 36B and peripheral members.

The flange 58A (the second flange) is bent from the rear end of the reinforcement member 36A, and is provided so as to extend outward in the vehicle width direction. As aforementioned, the flange 58A (the second flange) is provided so as to partially coincide (overlap) with the side wall flange 56A (the first flange) of the rear side member 14A in the vehicle width direction with the side wall 54 (the second side wall) of the center floor cross member 16 interposed therebetween.

As aforementioned, the rear side member 14A is provided with the inward-hook shaped structure in which the side wall flange 56A (the first flange) is provided to be bent from the side wall 48A (the first side wall) and extend inward in the vehicle width direction. On the other hand, the reinforcement member 36A is provided with the outward-hook shaped structure in which the flange 58A (the second flange) is provided to be bent from the side wall 74A (the third side wall) and extend outward in the vehicle width direction. Furthermore, the side wall flange 56A (the first flange) and the flange 58A (the second flange) are disposed to oppose each other with the side wall 54 (the second side wall) of the center floor cross member 16 interposed therebetween.

By employing this configuration, the side wall 48A of the rear side member 14A is disposed more outward in the vehicle width direction than the side wall 74A of the reinforcement member 36A, at the contact position with the side wall 54 of the center floor cross member 16. As a result, as described later, in the last half period of the rear collision, it is possible to generate a deformation mode to turn the rear side member 14A toward the vehicle outward direction around the bending point between the side wall 74A and the flange 58A of the reinforcement member 36A as a rotation center thereof.

The opposite flange 38A (the third flange) of the reinforcement member 36A is provided so as to be bent from the front end of the side wall 74A (the third side wall) and extend outward in the vehicle width direction. The opposite flange 38A is in contact with the opposite side wall 32 (the fourth side wall) of the center floor cross member 16.

Figure 4:
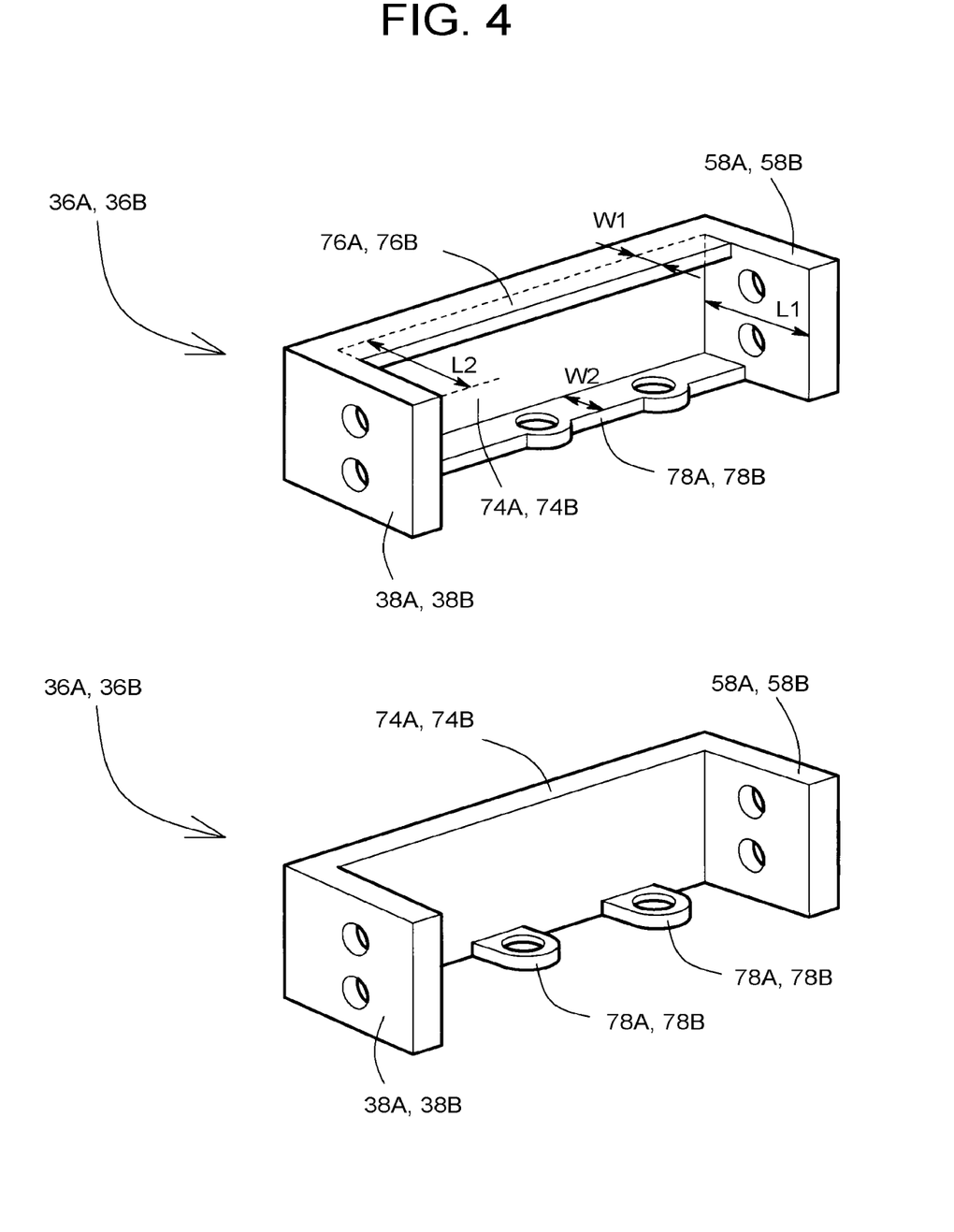
FIG. 4 is a perspective view showing examples of a reinforcement member.

An upper drawing of FIG. 4 exemplifies only the reinforcement member 36A taken out from FIG. 3. The reinforcement member 36A may include a ceiling wall 76A and a bottom wall 78A in addition to the side wall 74A, the flange 58A, and the opposite flange 38A. The bottom wall 78A includes a joining surface (a welding surface) that allows the reinforcement member 36A to be joined to the bottom wall 64 of the center floor cross member 16. The ceiling wall 76A is provided so as to provide the reinforcement member 36A with a constant strength.

If the ceiling wall 76A and the bottom wall 78A excessively protrude, tilting deformation of the flange 58A, as described later, might be hindered. To prevent this, it is preferable to set a protruding width W1 of the ceiling wall 76A and a protruding width W2 of the bottom wall 78A to be less than half of either one of a length L1 of the flange 58A and a length L2 of the opposite flange 38A, which is shorter than the other, for example.

As shown in a lower drawing of FIG. 4, the ceiling wall 76A may be removed from the reinforcement member 36A. The bottom wall 78A may be partially removed except for a welding region thereof.

Deformation Mode at Rear Collision Time

Figure 5:
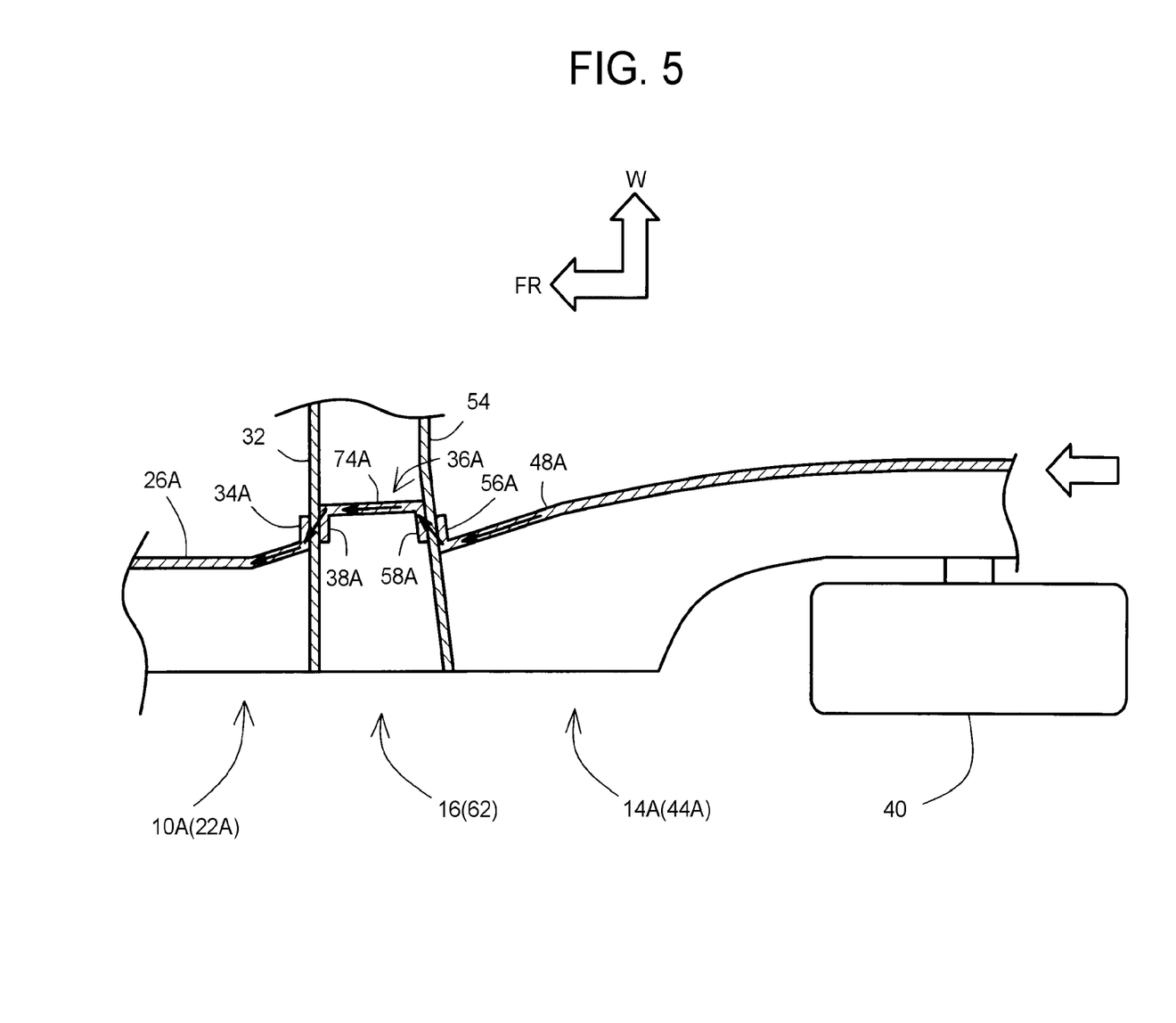
FIG. 5 is a perspective view explaining load transmission in a first half period of a rear collision.
Figure 6:
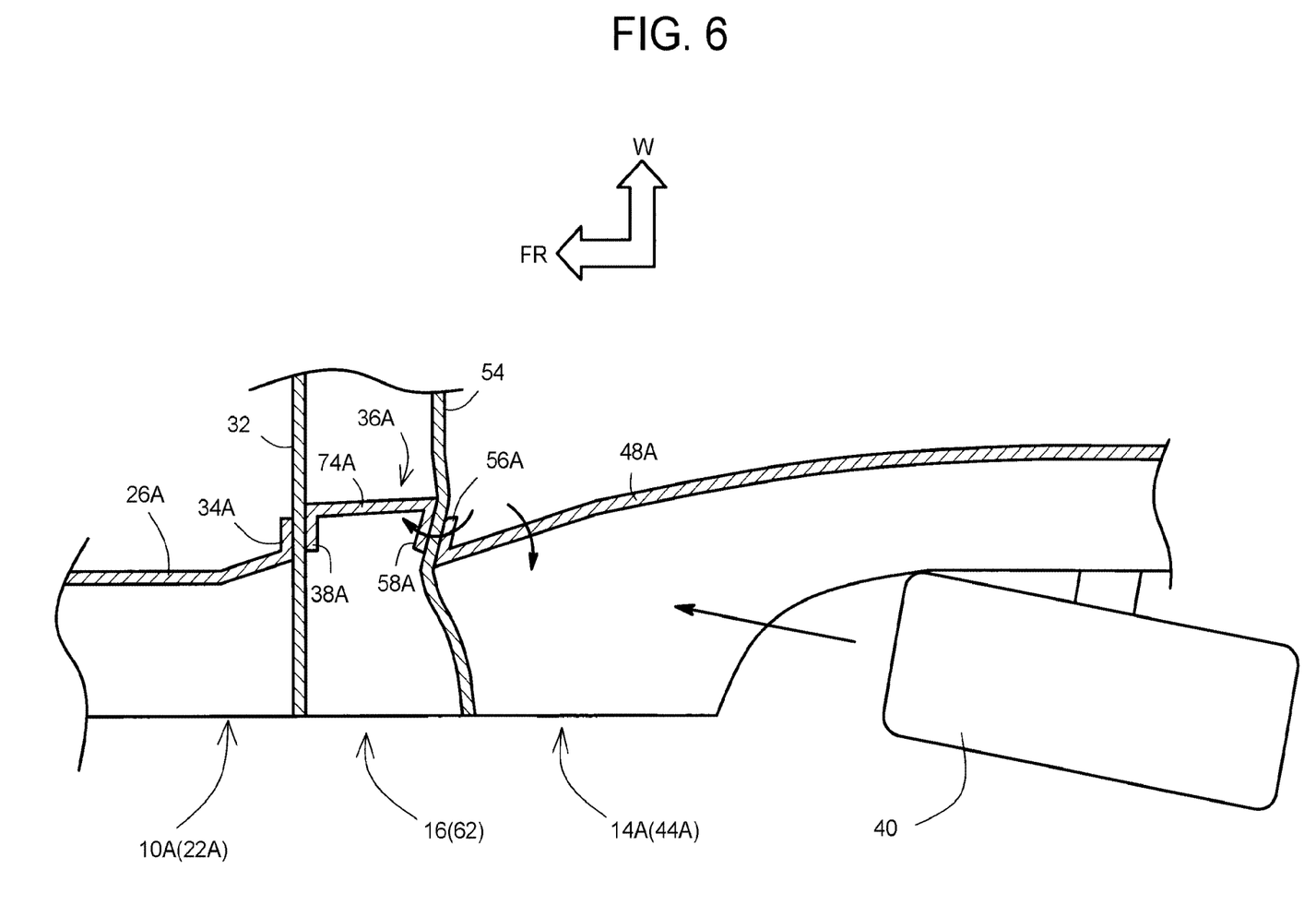
FIG. 6 is a perspective view explaining load transmission and a deformation process in a last half period of the rear collision.

With reference to FIG. 5 and FIG. 6, a deformation mode at the rear collision time (when a collision occurs from behind the vehicle) of the vehicle rear structure according to the present embodiment will be described. Both FIG. 5 and FIG. 6 show views of a section E-E (section in a plan view) of FIG. 3. As with the description of FIG. 3, FIG. 5 and FIG. 6 mainly show the rear side member 14A, the reinforcement member 36A, and the under reinforcement 10A on the left side in the vehicle width direction. However, the rear side member 14B, the reinforcement member 36B, and the under reinforcement 10B on the right side in the vehicle width direction have the same configurations as those of the above members, and thus they are deemed to have the same deformation mode, in principle.

FIG. 5 schematically shows a condition in the first half period of the rear collision. A not-illustrated obstacle (barrier) collides against the vehicle from behind the vehicle, and a load (mainly a compressive load) is inputted from a not-illustrated rear bumper reinforcement into the rear side member 14A. This load is transmitted from the side wall 48A (the first side wall) and the side wall flange 56A (the first flange) of the rear side member 14A via the side wall 54 (the second side wall) of the center floor cross member 16 to the flange 58A (the second flange) and the side wall 74A (the third wall) of the reinforcement member 36A.

If no reinforcement member 36A is provided, the load inputted from the rear side member 14A in the vehicle frontward direction is received by the side wall 54 (the second side wall) of the center floor cross member 16. At this time, the load is inputted into the side wall 54 in a direction orthogonal to the extending direction of the side wall 54, and this load becomes a bending load; therefore, the side wall 54 is more easily deformed compared with the case of a compressive load applied in the extending direction. In the present embodiment, the side wall 74A of the reinforcement member 36A is provided to extend along the input direction of the load inputted from the rear side member 14A, and the load is brought to be inputted (transmitted) into this side wall 74A, to thereby suppress deformation of the center floor cross member 16.

The load having been transmitted to the side wall 74A of the reinforcement member 36A is transmitted to the side wall 26A (the fifth side wall) via the opposite flange 38A (the third flange), the opposite side wall 32 (the fourth side wall) of the center floor cross member 16, and the side wall flange 34A (the fourth flange) of the under reinforcement 10A. In this manner, the load is transmitted while deformation of the respective frame members and the reinforcement member 36A is suppressed.

This transmitting process is effective not only at the rear collision time, but also at the time of a collision from the vehicle front (front collision). That is, a load inputted from the not-illustrated front bumper reinforcement and the front side member is transmitted to the side wall 26A of the under reinforcement 10A. The load is further transmitted from the side wall flange 34A to the opposite side wall 32 of the center floor cross member 16, the opposite flange 38A and the side wall 74A of the reinforcement member 36A. Further, the load is transmitted from the side wall 74A to the side wall 48A via the flange 58A, the side wall 54 of the center floor cross member 16, and the side wall flange 56A of the rear side member 14A.

FIG. 6 schematically illustrates a condition of the last half period of the rear collision. If the load is applied from the vehicle rear, the rear side member 14A comes (are pushed) into the vehicle front. At this time, a force that turns the rear side member 14A outward in the vehicle width direction around the bending point between the side wall 74A and the flange 58A of the reinforcement member 36A as a rotation center thereof is applied to the rear side member 14A.

As aforementioned, at the contact position of the side wall 54 of the center floor cross member 16, the side wall 48A of the rear side member 14A is disposed at a position deviating outward in the vehicle width direction from the side wall 74A of the reinforcement member 36A. In addition, the side wall flange 56A of the rear side member 14A and the flange 58A of the reinforcement member 36A are disposed so as to oppose each other via the side wall 54 of the center floor cross member 16.

In this structure, when the side wall 48A of the rear side member 14A is pushed into the vehicle front, in the rear side member 14A and the reinforcement member 36A, the side wall flange 56A and the flange 58A that are relatively weak to a load in the vehicle longitudinal direction become bending-deformed. Specifically, there is caused such a bending deformation that the flange 58A tilts toward the side wall 74A side around the bending point between the flange 58A and the side wall 74A as a rotation center thereof. Due to this bending deformation, a force that urges the rear side member 14A outward in the vehicle width direction is applied to the rear side member 14A. As a result, the rear side member 14A is suppressed from tilting inward more than the related art.

After the bending deformation of the flange 58A and the side wall flange 56A, the side wall 48A of the rear side member 14A comes into the outer side in the vehicle width direction of the side wall 74A of the reinforcement member 36A, so that further advance of the side wall 48A into the inner side in the vehicle width direction is pushed and resisted by the side wall 74A of the reinforcement member 36A. Accordingly, the rear side member 14A is suppressed from tilting inward more than the related art.

As aforementioned, the side wall flange 56A of the rear side member 14A and the flange 58A of the reinforcement member 36A are the weakest portions in the frame structure of the vehicle rear, relative to a load inputted at the rear collision time. Therefore, at the rear collision time, deformation is started from these weakest portions before the other members are deformed. For this reason, it becomes easier to predict the deformation mode at the rear collision time, that is, prediction of the deformation mode is more reliable (crush is caused as predicted). Accordingly, designing of yield strengths of peripheral members of the weakest portions can be readily feasible.

In the present embodiment, as a solution for preventing the rear side member 14A from tilting inward, the reinforcement member 36A having a smaller dimension and a simpler structure than those of the other members is used; therefore, it is possible to attain inward tilting suppression at a lower cost, compared with other means (for example, enhancement of rigidity strength of the respective members).

Other Embodiments

In the aforementioned embodiment, the side walls 74A, 74B and the opposite flanges 38A, 38B of the reinforcement members 36A, 36B are configured in an outward-hook shape, the side walls 26A, 26B and the side wall flanges 34A, 34B of the under reinforcements 10A, 10B are configured in an inward-hook shape, but the present disclosure is not limited to this manner.

Figure 7:
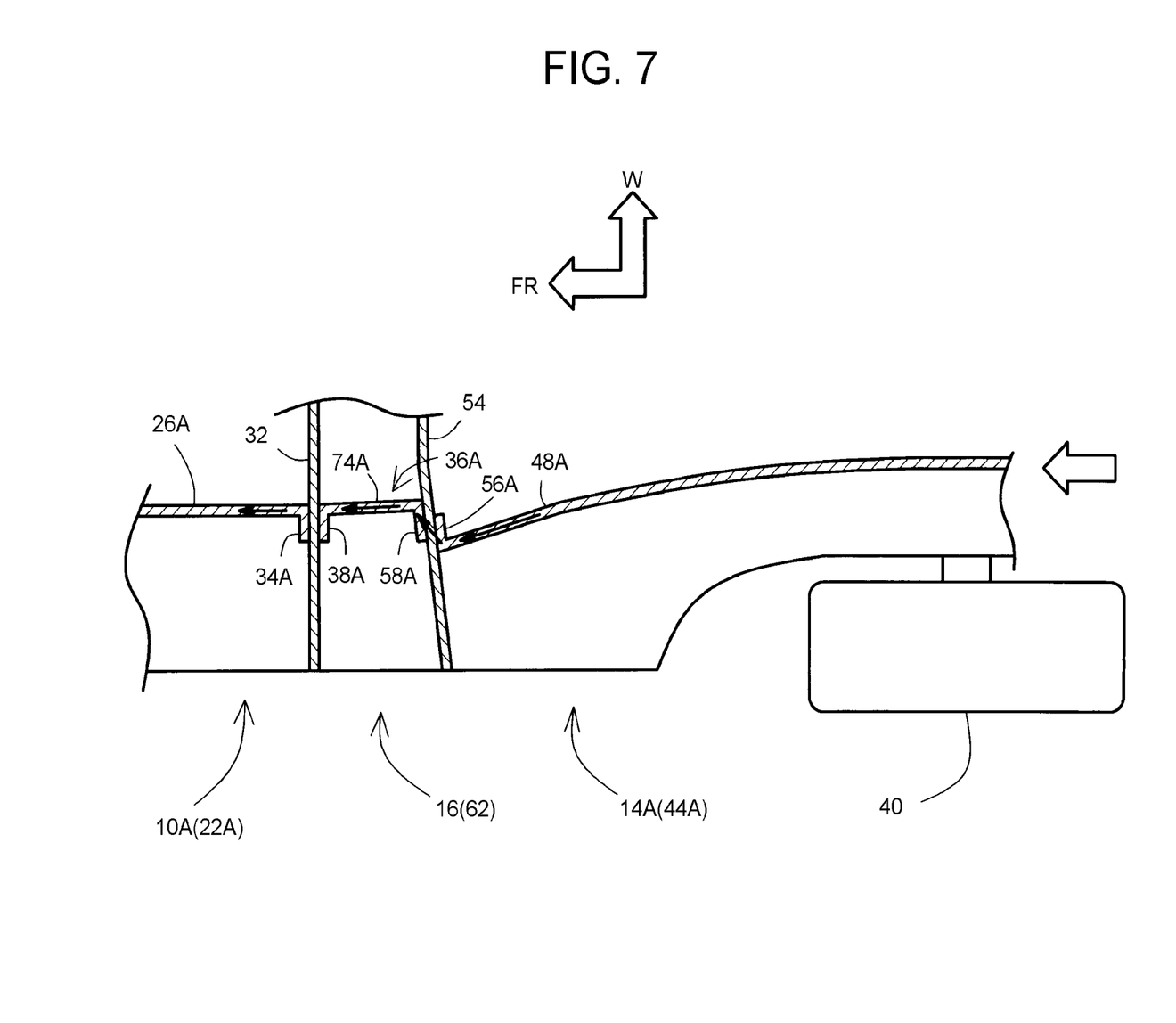
FIG. 7 is a view exemplifying a vehicle rear structure according to another embodiment (an outward-hook shaped structure of the under reinforcement)

For example, as shown in FIG. 7, the side walls 74A, 74B and the opposite flanges 38A, 38B of the reinforcement members 36A, 36B, and the side walls 26A, 26B and the side wall flanges 34A, 34B of the under reinforcements 10A, 10B may be both configured in an outward-hook shape.

In addition, the side walls 74A, 74B (the third side walls) of the reinforcement members 36A, 36B and the side walls 26A, 26B (the fifth side walls) of the under reinforcements 10A, 10B may coincide with each other in the vehicle width direction. With this configuration, it becomes possible to transmit a load (a compressive load) from the side walls 74A, 74B of the reinforcement members 36A, 36B to the side walls 26A, 26B of the under reinforcements 10A, 10B.

Figure 8:
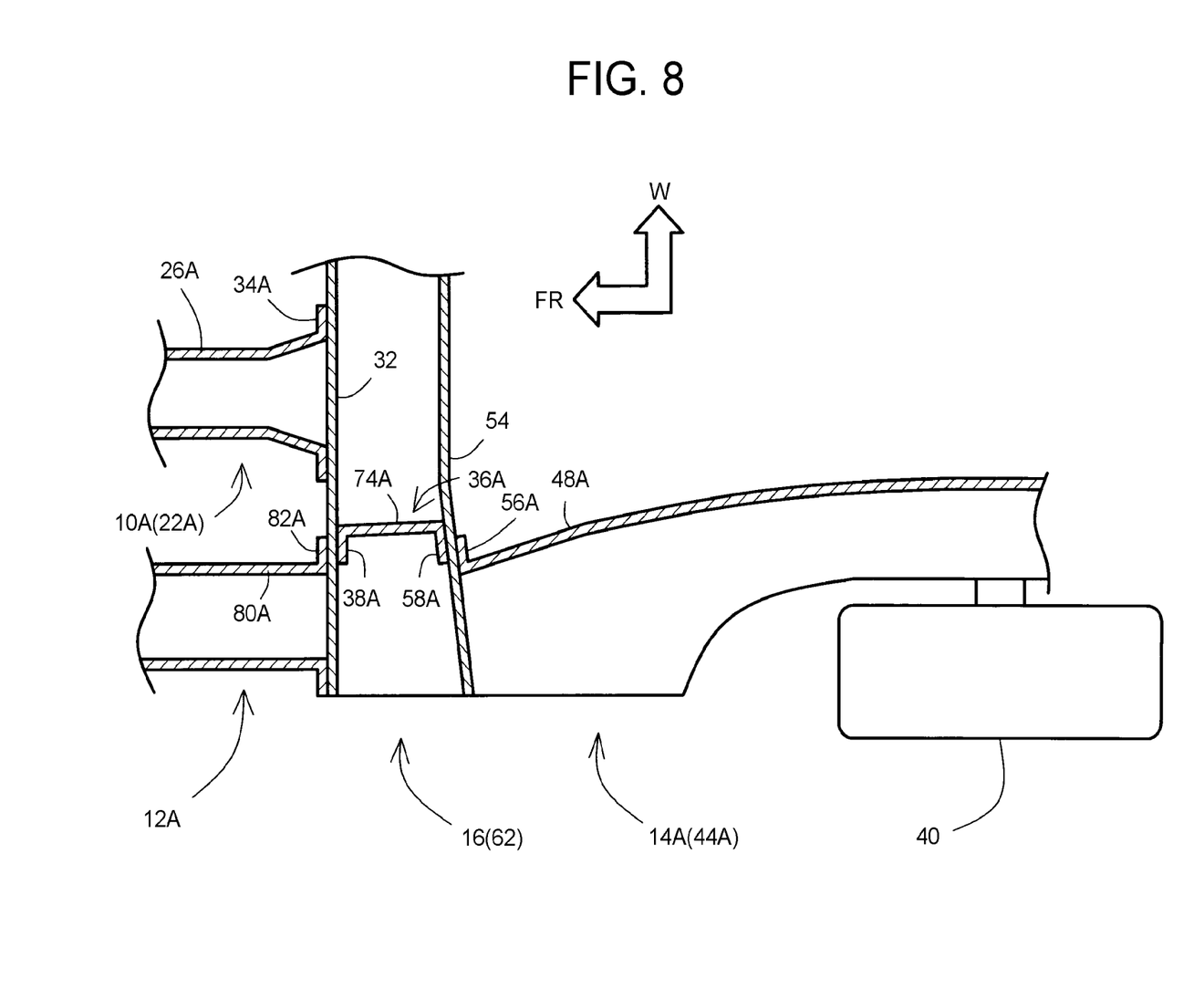
FIG. 8 is a view exemplifying a vehicle rear structure according to further another embodiment (a structure with connection to a rocker whose side wall has an inward-hook shaped structure)

Depending on the type of a vehicle, as shown in FIG. 8, there may be provided the rockers 12A, 12B instead of the under reinforcements 10A, 10B, as the frame members that overlap with the front ends of the rear side members 14A, 14B in the vehicle width direction with the center floor cross member 16 interposed therebetween. In such a case, it may be configured that flanges 82A, 82B, which are bent from the rear ends of side walls 80A, 80B of the rockers 12A, 12B and extend in the vehicle width direction while being in contact with the center floor cross member 16, at least partially coincide with the opposite flanges 38A, 38B of the reinforcement members 36A, 36B in the vehicle width direction.

Figure 9:
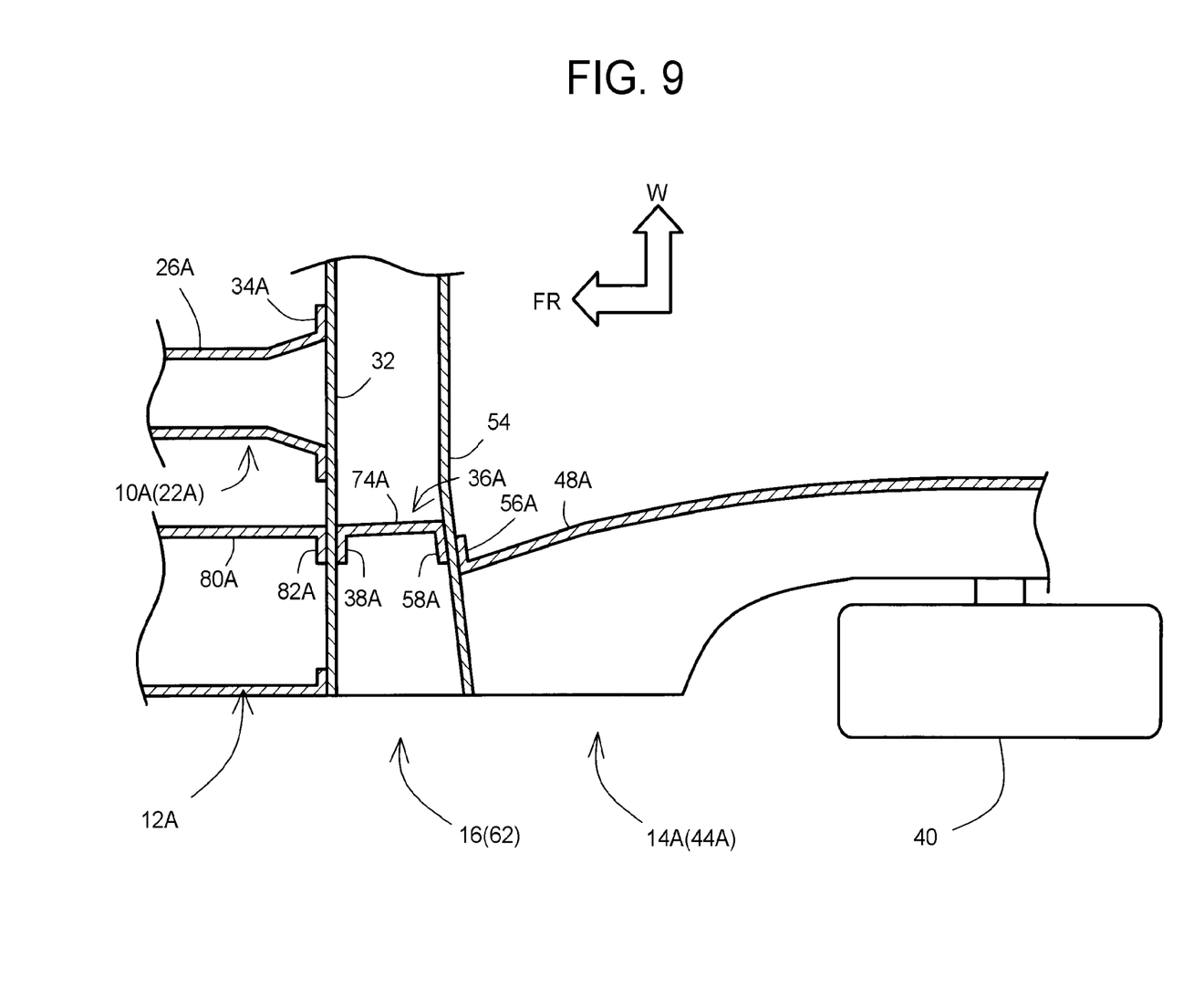
FIG. 9 is a view exemplifying a vehicle rear structure according to further another embodiment (a structure with connection to a rocker whose side wall has an outward-hook shaped structure)

In addition, as shown in FIG. 8, the flanges 82A, 82B may be configured in an inward-hook shape in which the flanges 82A, 82B are bent inward in the vehicle width direction relative to the side walls 80A, 80B, or as shown in FIG. 9, the flanges 82A, 82B may be configured in an outward-hook shape in which the flanges 82A, 82B are bent outward in the vehicle width direction relative to the side walls 80A, 80B. In the latter case, the side walls 80A, 80B (the fifth side walls) of the rockers 12A, 12B and the side walls 74A, 74B (the third side walls) of the reinforcement member 36A may coincide with each other in the vehicle width direction.

In the aforementioned embodiment, the cross member in contact with the front ends of the rear side members 14A, 14B is the center floor cross member 16, but the present disclosure is not limited to this manner. Depending on the type of a vehicle, the rear cross member 18A (see FIG. 1) may be connected to the front ends of the rear side members 14A, 14B in some cases. In this case, the reinforcement members 36A, 36B may be disposed to lower members of the rear cross member 18A. The side walls 74A, 74B of the reinforcement members 36A, 36B are provided so as to extend across between the two opposite side walls of the rear cross member 18A, and the opposite flanges 38A, 38B are in contact with the front ends of these opposite side walls, and the flanges 58A, 58B are in contact with the rear ends of these opposite side walls. The reinforcement members 36A, 36B are arranged such that the flanges 58A, 58B at least partially coincide with the flanges 56A, 56B of the rear side members 14A, 14B in the vehicle width direction. In addition, the side walls 74A, 74B of the reinforcement members 36A, 36B are disposed more inward in the vehicle width direction than the side walls 48A, 48B of the rear side members 14A, 14B. With this configuration, at the rear collision time, the aforementioned turning of the flanges 58A, 58B and the flanges 56A, 56B is generated, to thus suppress the rear side members 14A, 14B from tilting inward.

What is claim is:

1. A vehicle rear structure comprising:
rear side members including first side walls provided so as to extend from a vehicle rear to a vehicle front in a manner as to be inclined outward from an inner side in a vehicle width direction so as to avoid vehicle rear wheels, and first flanges that are bent from front ends of the first side walls, the first flanges provided so as to extend inward in the vehicle width direction;
a cross member having a second side wall provided so as to extend in the vehicle width direction in a manner as to be in contact with the first flanges of the rear side members; and
reinforcement members including: third side walls provided so as to extend to the second side wall of the cross member from the vehicle front toward the vehicle rear; and second flanges that are bent from rear ends of the third side walls, extends outward in the vehicle width direction, and at least partially coincide with the first flanges of the rear side members in the vehicle width direction with the second side wall of the cross member interposed therebetween.

2. The vehicle rear structure according to claim 1, wherein the cross member includes a fourth side wall that opposes the second side wall of the cross member,
each reinforcement member includes a third flange that is bent from a front end of the third side wall of the reinforcement member, extends in the vehicle width direction, and is in contact with a fourth side wall of the cross member, and
the vehicle rear structure further comprises frame members each of which includes: a fourth flange that is in contact with the fourth side wall of the cross member in a manner as to at least partially coincide with the third flange of the reinforcement member in the vehicle width direction with the fourth side wall of the cross member interposed therebetween; and a fifth side wall that is bent from the fourth flange and extends to the vehicle front.

3. The vehicle rear structure according to claim 2, wherein the third side walls of the reinforcement members and the fifth side walls of the frame members coincide with each other at respective positions in the vehicle width direction.

4. The vehicle rear structure according to claim 2, wherein the frame members are under reinforcements provided under a vehicle cabin.

5. The vehicle rear structure according to claim 2, wherein the frame members are rockers provided at end parts in the vehicle width direction.

* * * * *